(12) United States Patent
Ziegler et al.

(10) Patent No.: US 11,611,436 B2
(45) Date of Patent: Mar. 21, 2023

(54) MANAGEMENT SERVICES API GATEWAY

(71) Applicant: NetApp, Inc., Sunnyvale, CA (US)

(72) Inventors: Eric Ziegler, Broomfield, CO (US); Adam Haid, Erie, CO (US); Brian Macdonald, Louisville, CO (US)

(73) Assignee: NetApp, Inc., San Jose, CA (US)

( * ) Notice: Subject to any disclaimer, the term of this patent is extended or adjusted under 35 U.S.C. 154(b) by 335 days.

(21) Appl. No.: 16/857,569

(22) Filed: Apr. 24, 2020

(65) Prior Publication Data

US 2021/0336788 A1 Oct. 28, 2021

(51) Int. Cl.
*H04L 9/32* (2006.01)
*G06F 9/54* (2006.01)
*H04L 12/66* (2006.01)
*H04L 67/02* (2022.01)

(52) U.S. Cl.
CPC ............ *H04L 9/3213* (2013.01); *G06F 9/547* (2013.01); *H04L 9/3228* (2013.01); *H04L 12/66* (2013.01); *H04L 67/02* (2013.01)

(58) Field of Classification Search
CPC ..... H04L 9/3213; H04L 9/3228; H04L 12/66; H04L 67/02; H04L 63/0815; H04L 63/0823; H04L 63/10; H04L 67/56; H04L 67/1097; G06F 9/547; G06F 21/6218; G06F 21/629

USPC ...................... 713/153, 168, 151, 152; 726/2
See application file for complete search history.

(56) References Cited

U.S. PATENT DOCUMENTS

2017/0250853 A1* 8/2017 Evans ...................... G06F 9/54

* cited by examiner

*Primary Examiner* — Izunna Okeke
(74) *Attorney, Agent, or Firm* — Jaffery Watson Mendonsa & Hamilton LLP

(57) ABSTRACT

A technique provides cohesive and secure access to management services of a distributed storage architecture deployed on compute and storage nodes of a cluster. The management services are organized as a platform that encompasses a plurality of underlying individual services each having an applications programming interface (API) that are together securely accessible via an API gateway. The gateway is configured to support a "browsable" directory of the APIs that enables a client to identify various underlying services available within the cluster. In an embodiment, the underlying services "self-register" at the gateway to provide a single, unified location for the client to access the services. The API gateway includes a reverse-proxy server that is configured to provide a single point of entry for clients interacting with the individual services underlying the management services platform. User authorization and authentication security are implemented at the API gateway rather than on the underlying services.

20 Claims, 4 Drawing Sheets

MANAGEMENT SERVICES API GATEWAY

BACKGROUND

Technical Field

The embodiments herein relate to services of a cluster and, more specifically, to cohesive and secure access to management services of the cluster.

Background Information

A plurality of storage and compute nodes may be organized as a cluster to provide a distributed storage architecture configured to service requests issued by one or more clients of the cluster. The nodes include hardware resources, such processors, memory and networking, as well as storage devices configured to provide services, such as data virtualization and storage services, in a deployment of the cluster. To that end, the service requests issued by clients may include management services for data stored on the storage devices of the cluster. The data served by the nodes may be distributed across multiple storage units embodied as persistent storage devices, such as hard disk drives, solid state drives, flash memory systems, or other storage devices.

Management services may include a set of individual services, each of which has a distinct application programming interface (API). To secure API use/access, each service typically implements its own user authorization and authentication security. As a result of the independent security implementations of the services, an administrative and use burden is placed on the user accessing those service, which also requires a level of security expertise on behalf of the user. Additionally, having a large number of independent APIs may require the user to navigate and employ multiple APIs as a part of using the management services.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
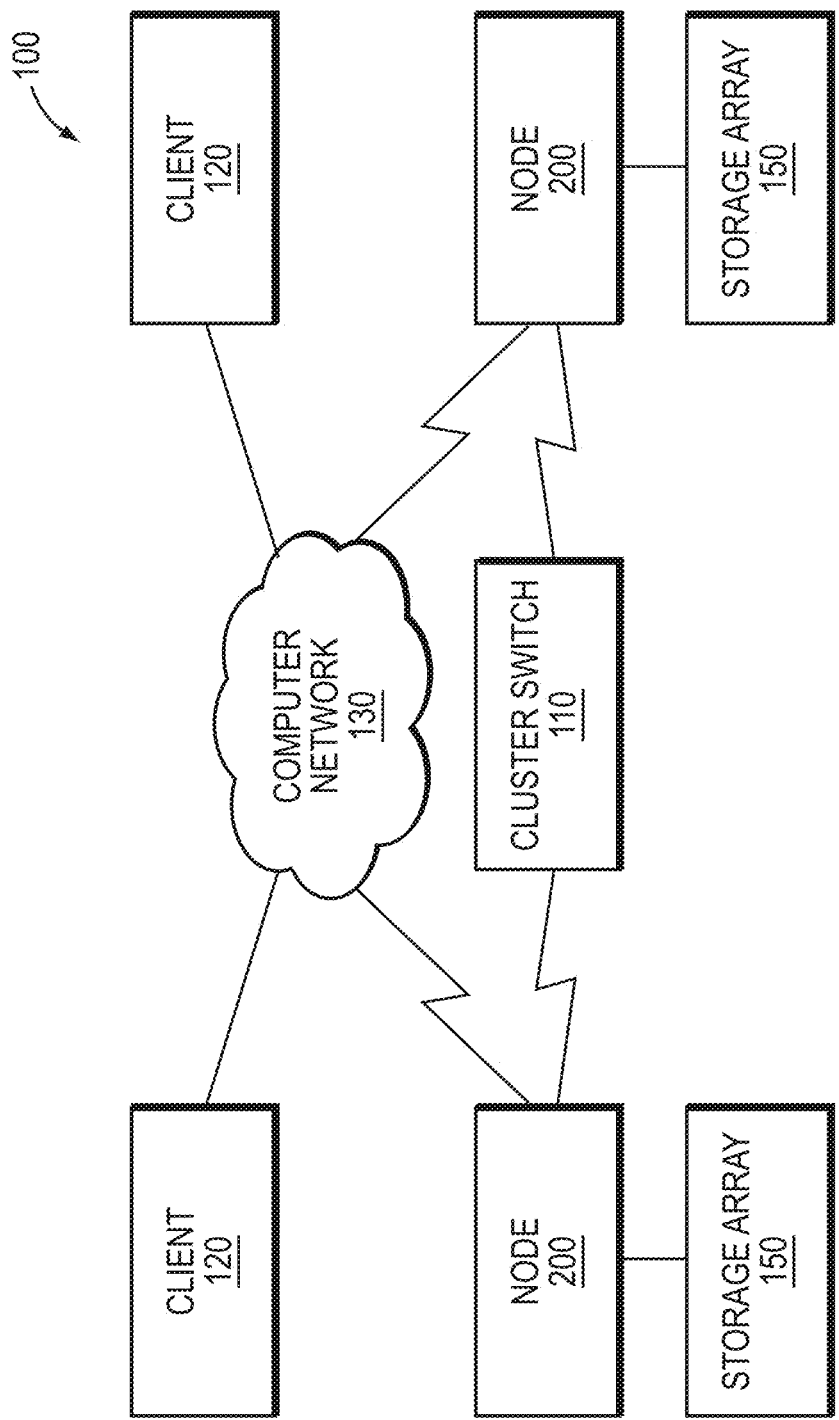
FIG. 1 is a block diagram illustrating a plurality of storage and compute nodes interconnected as a storage cluster.

The embodiments described herein are directed to a technique configured to provide cohesive and secure access to management services of a distributed storage architecture deployed on compute and storage nodes of a cluster. The management services are organized as a platform that encompasses a plurality of underlying individual services each having an applications programming interface (API) that are together securely accessible via an API gateway. In effect, the individual service APIs arm exported to the gateway which acts as a secure gatekeeper for a client to access those APIs. Illustratively, the gateway is configured to support a "browsable" directory of the APIs to enable access to a variety of services within the cluster. To that end, the gateway implements a browsable API specification that enables the client to identify the various underlying services available within the management services platform.

In an embodiment, the underlying services "self-register" at the gateway to provide a single, unified location for the client to access the services. For example, when invoked, an underlying service provides a configuration file to the API gateway, which dynamically loads the file into a code generation engine of the gateway to generate appropriate proxy code that allows the client to access the API of the service via the proxy. Unlike a typical scenario that has a static configuration which configures a gateway with respect to processing of incoming requests directed to underlying services, the technique allows the management services reach out to the gateway to register themselves to dynamically configure the gateway for interacting with the services when processing the requests.

As a result, the API gateway further includes a reverse-proxy server that is configured to provide a single point of entry having uniform security implementation for clients interacting with the individual services underlying the management services platform. Each service may represent different functionality within the distributed storage architecture and, to that end, may present one or more individual APIs needed to interact with the service. The gateway presents the individual APIs of the underlying services as a single unified API namespace, so that the client need only interact with a single entity, i.e., the gateway, to use the management services. For example, to perform a storage access to the storage devices of the cluster, the client issues a storage API request to the gateway, which forwards (routes) the request to underlying storage service of the management services.

In an embodiment, user authorization and authentication security are implemented at the API gateway rather than on the underlying services. To that end, the gateway employs the reverse-proxy server in cooperation with an authorization framework to implement an authentication protocol (e.g., OAuth 2.0 protocol) that enables authenticated access by the client to one or more services in a secure manner. As such, a single authentication scheme may be used to access the large variety of services within the cluster. In an embodiment, a federated approach employing an authentication server via the gateway is used to authenticate a user and verify an access request to the underlying services. Briefly, the authorization framework is invoked to exchange an authentication code, obtained from an authentication server, for an access token that grants the client (via the reverse-proxy server) access to the service using an API. The authentication server generates and distributes the access token in accordance with the authentication protocol, wherein a part of the access token is provided to the reverse-proxy server and another part is provided to the service.

The technique described herein enables cohesive and secure access to management services of the distributed storage architecture by providing a single point of entry for clients interacting with the services underlying the management services platform. The single point of entry, i.e., the API gateway, is configured to facilitate dynamic registration of the underlying services the management services platform, such that the gateway does not have to be brought offline and rebuilt when adding or removing services from the platform. Moreover, dynamic generation of the proxy code obviates a pre-defined static configuration approach that may necessitate taking the gateway offline, thereby further increasing the durability of access to the services.

DESCRIPTION

Cluster

FIG. 1 is a block diagram illustrating a plurality of nodes 200, such as storage and compute nodes, interconnected as a cluster 100 and configured to provide various services, such virtualization, storage and management services, for information, i.e., data and metadata, organized and stored on storage devices of the cluster. The nodes 200 may be interconnected by one or more cluster switches 110 and include functional components that cooperate to provide a distributed, scale-out storage architecture of the cluster 100. The components of each node 200 include hardware and software functionality that enable the node to connect to and service one or more clients 120 over a computer network 130, as well as to a storage array 150 of storage devices, to thereby render the services in accordance with the distributed storage architecture.

Each client 120 may be embodied as a general-purpose computer configured to interact with the node 200 in accordance with a client/server model of information delivery. That is, the client 120 may request the services of the node 200, and the node may return the results of the services requested by the client, by exchanging packets over the network 130. The client may issue packets including file-based access protocols, such as the Network File System (NFS) and Common Internet File System (CIFS) protocols over the Transmission Control Protocol/Internet Protocol (TCP/IP), when accessing information on the node in the form of storage objects, such as files and directories. However, in an embodiment, the client 120 illustratively issues packets including block-based access protocols, such as the Small Computer Systems Interface (SCSI) protocol encapsulated over TCP (iSCSI) and SCSI encapsulated over FC (FCP), when accessing information in the form of storage objects such as logical units (LUNs).

Figure 2:
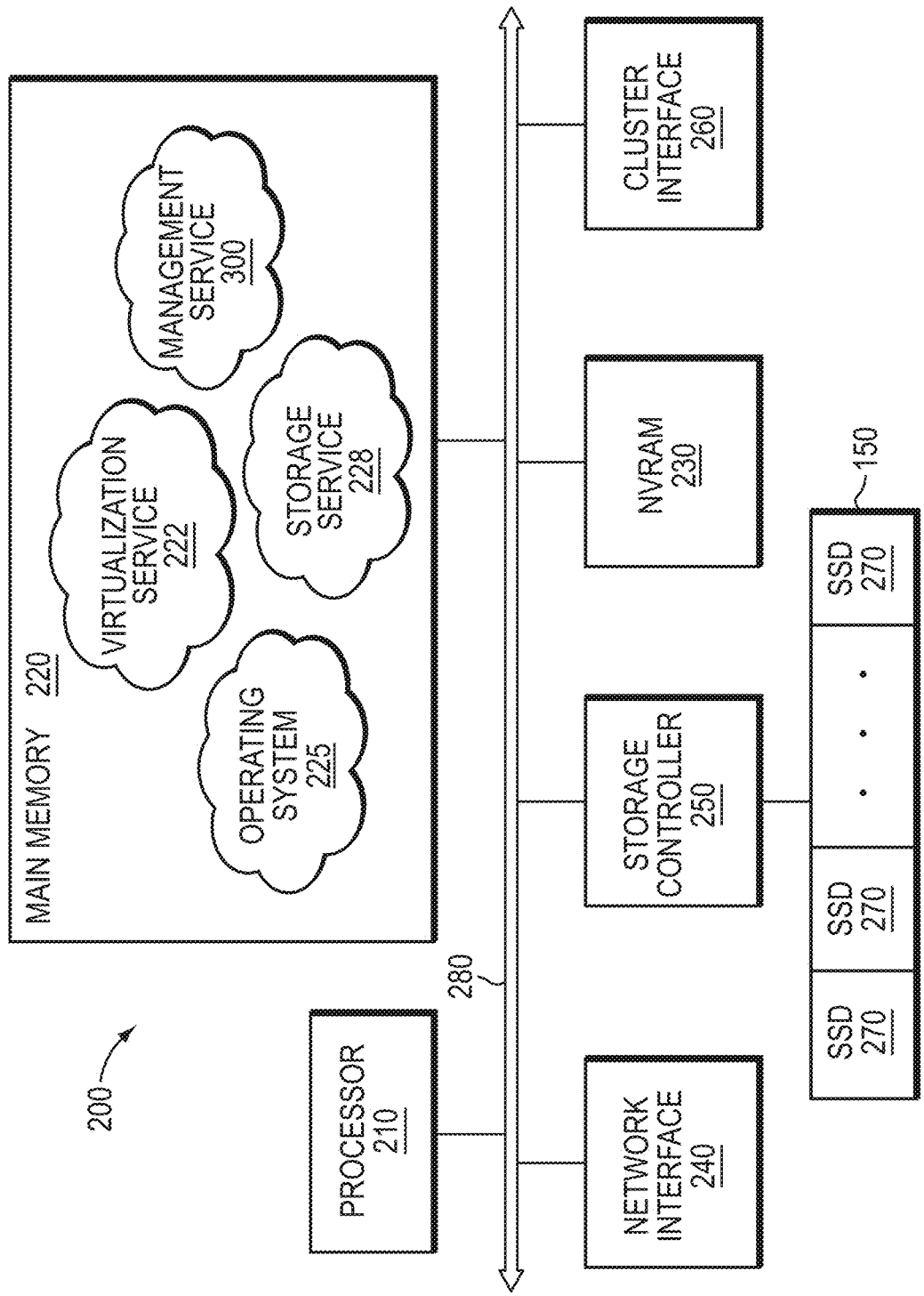
FIG. 2 is a block diagram illustrating a node.

FIG. 2 is a block diagram illustrating an example of a set of components of a node 200. As illustrated in FIG. 2, node 200 can include one or more processing units (processors) 210, a main memory 220, a non-volatile random access memory (NVRAM) 230, a network interface 240, one or more storage controllers 250 and one or more cluster interfaces 260 interconnected by a system bus 280. The network interface 240 may include one or more ports adapted to couple the node 200 to the client(s) 120 over computer network 130, which may include point-to-point links, wide area networks, virtual private networks implemented over a public network (Internet) or a shared local area network. The network interface 240 thus includes the mechanical, electrical and signaling circuitry needed to connect the node to the network 130, which may embody an Ethernet or Fibre Channel (FC) network.

The main memory 220 may include memory locations that are addressable by the processor 210 for storing software programs and data structures associated with the embodiments described herein. The processor 210 may, in turn, include processing elements and/or logic circuitry configured to execute the software programs, such as virtualization services 222, storage services 228, and management services 300, and manipulate the data structures. An operating system 225, portions of which are typically resident in memory 220 (in-core) and executed by the processing elements (e.g., processor 210), functionally organizes the node by, inter alia, invoking operations in support of the services implemented by the node. A suitable operating system 225 may include a general-purpose operating system (e.g., the UNIX® series or Microsoft Windows® series of operating systems) or an operating system with configurable functionality such as microkernels and embedded kernels. However, in some embodiments, the operating system can be a version of the Linux® operating system. It will be apparent to those skilled in the art that other processing and memory means, including various computer readable media, may be used to store and execute program instructions pertaining to the embodiments herein. Also, while the embodiments herein are described in terms of software programs, services, code, processes, and computer applications stored in memory, alternative embodiments also include the code, processes and programs being embodied as logic and/or modules consisting of hardware, software, firmware, or combinations thereof.

The storage controller 250 cooperates with the services implemented on the node 200 to access information requested by the client 120. The information can be stored on storage devices such as solid-state drives (SSDs) 270, embodied as flash storage devices, of storage array 150. In an embodiment, the flash storage devices may be block-oriented devices (i.e., drives accessed as blocks) based on NAND flash components. In some embodiments, the NAND flash components may include single-level-cell (SLC) flash, multi-level-cell (MLC) flash or triple-level-cell (TLC) flash. Other block-oriented, non-volatile, solid-state electronic devices (e.g., drives based on storage class memory components) may be advantageously used with some embodiments. The storage controller 250 may include one or more ports having I/O interface circuitry that couples to the SSDs 270 over an I/O interconnect arrangement, such as a conventional serial attached SCSI (SAS), serial ATA (SATA) topology, and Peripheral Component Interconnect (PCI) express.

Each cluster interface 260 may include one or more ports adapted to couple the node 200 to the other node(s) of the cluster 100. In an embodiment, a plurality of Ethernet ports (e.g., 10 Gbps) may be used for internode communication, although it will be apparent to those skilled in the art that other types of protocols and interconnects may be utilized within the embodiments described herein. The NVRAM 230 may include a back-up battery or other built-in last-state retention capability (e.g., non-volatile semiconductor memory such as storage class memory) that is capable of maintaining data in light of a failure to the node and cluster environment.

In an embodiment, the compute nodes are physically and logically different from the storage nodes. For example, the compute nodes illustratively include hardware resources, such processors, memory and networking, that cooperate to provide the management services 300, while the storage nodes include those hardware resources as well as storage that cooperate to provide the storage service 228. In addition, the compute nodes may execute software processes (e.g., VMware corporation ESXI™ hypervisors) to provide the virtualization service 222, whereas the storage nodes may execute a variant of the operating system 225 (e.g., a storage operating system) to provide the storage services.

Management Services API Gateway

Figure 3:
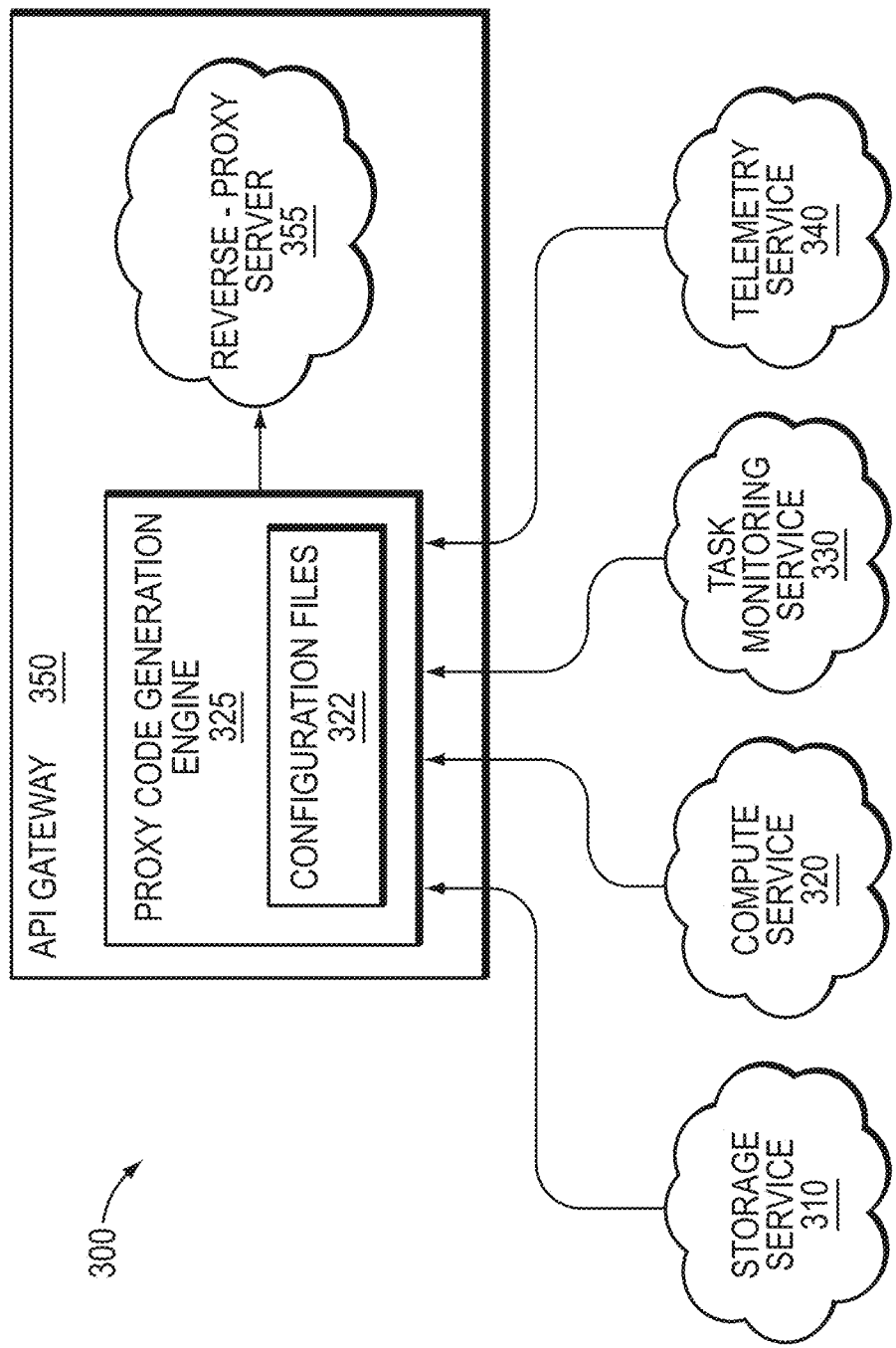
FIG. 3 is a diagram illustrating a management services platform of a distributed storage architecture implemented on the cluster.

FIG. 3 is a diagram illustrating a management service platform 300 of the distributed storage architecture implemented on the cluster. In an embodiment, the management services are organized as a platform 300 that encompasses a plurality of underlying services, such as a storage service 310, compute service 320, a task monitoring service 330, and a telemetry service, 340 each of which is configured to perform a specific function. The management services platform 300 is illustratively hosted on a virtual machine (VM), which is embodied as a management node and implemented on a compute node 200 of the cluster 100. In an embodiment, after installation and deployment of the nodes as the cluster, a deployment engine launches the VM on the compute node and configures the services as containers (e.g., Docker containers) within the VM utilizing a container orchestration platform (e.g., Docker Swarm).

To obviate confusion on behalf of a user (e.g., client) having to navigate and issue multiple requests in order to use the management services, the technique enables access to the services in a cohesive manner. To that end, the technique provides an API gateway 350 configured as a "browsable" directory of the APIs so as to enable access to a large variety of APIs and their associated services within the cluster. To that end, the gateway implements a browsable API specification that enables a client to identify the various underlying services available within the management services platform 300. The various services "self-register" at the gateway so as to provide a single, unified location. e.g., an internet protocol (IP) address and port, for the client to access the services. For example, when invoked (come online), the underlying services provide a configuration, e.g., configuration files 322, to the API gateway 350, which dynamically loads the files into a code generation engine 352, e.g., an NGINXT™ secure hypertext transfer protocol (HTTPS) server, of the gateway to generate appropriate proxy code for registering and configuring a point of access for the services as, e.g., a reverse-proxy server 355. Unlike a typical scenario that has a static configuration which configures a gateway with respect to processing of incoming requests directed to underlying services, the technique allows the management services 310-340 to reach out to the gateway 350 to register themselves and dynamically configure the reverse-proxy server 355 for interacting with the services when processing the requests. In an embodiment, the provided configuration files organize the APIs within a hierarchical namespace to implement the browsable directory of APIs via an HTTPS protocol.

Additionally, the API gateway 350 provides a single interface having a uniform security implementation to which the client may select an underlying service of the management services platform and issue a request, e.g., in the form of an API call, to access that service. Notably, the API gateway may be configured to handle any type of request (e.g., API call) over the HTTP(S) protocol. In an embodiment the API call is embodied as a Java Script Object Notation (JSON) remote procedure call (RPC) protocol over a secure connection (e.g., HTTPS), wherein parameters of the API call are encoded according to JSON and a version of the API call may be encoded in a URL over an HTTPS connection. The client issues the API call (e.g., a JSON-RPC over HTTPS) to the API gateway 350 (e.g., to an IP address and port of the API gateway), which verifies credentials of the API call and forwards the API call to the underlying service. Each service may represent different functionality within the distributed storage architecture and, thus, may present one or more individual APIs needed to interact with the service. The gateway 350 presents the individual APIs of the underlying services as a single unified API namespace, so that the client need only interact with a single entity, i.e., the gateway, using a single set of credentials to access the management services of the cluster. For example, to perform a storage access to the storage devices of the cluster, the client may browse the API directory to formulate a storage API request to the gateway, which distributes the request to the underlying storage service 310 of the management services platform 300.

Figure 4:
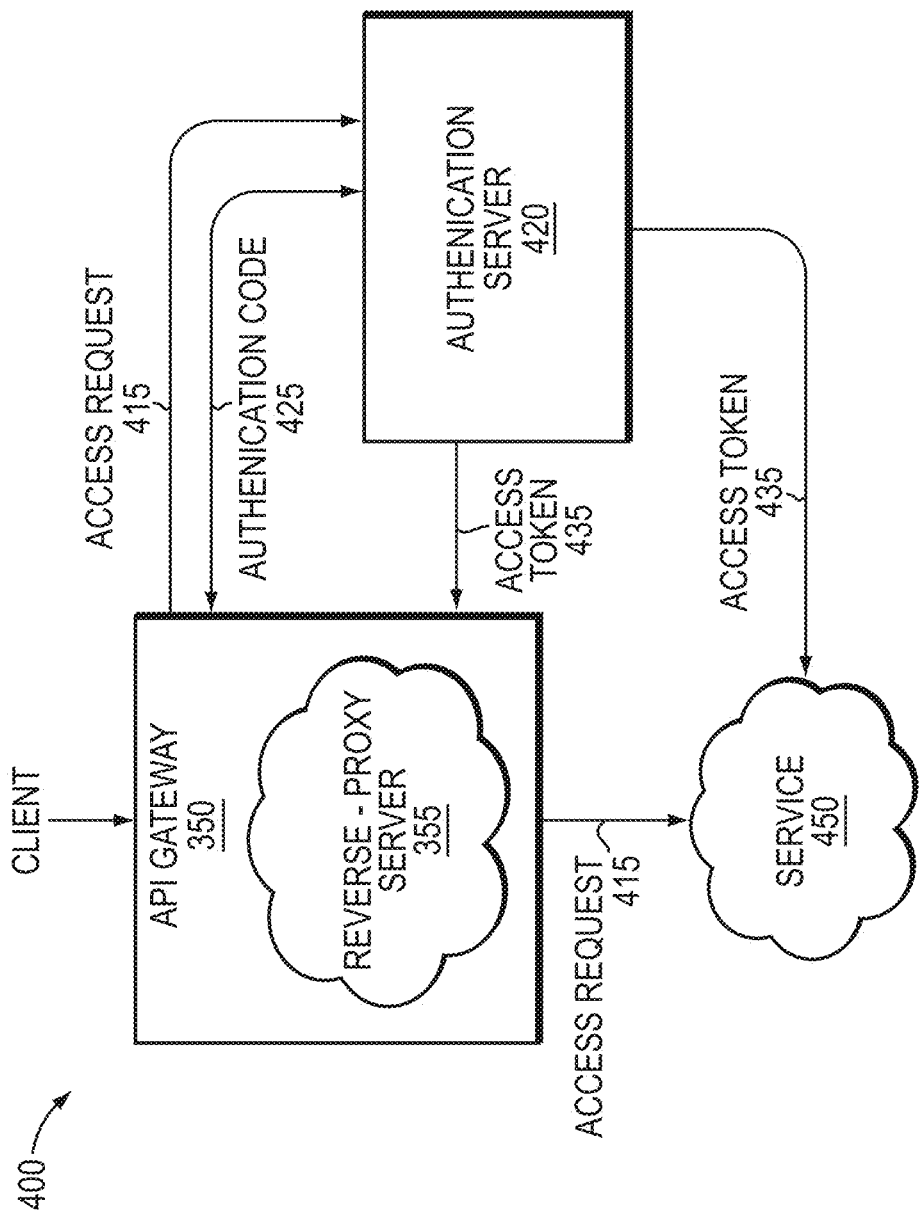
FIG. 4 illustrates an example workflow for providing cohesive and secure access to the management services platform deployed on the cluster.

FIG. 4 illustrates an example workflow 400 for providing cohesive and secure access to the management services platform deployed on the cluster. In an embodiment, the client may access the API gateway 350 either programmatically (e.g., as an API call or command line interface) or through a user interface, e.g., via a web browser. The reverse-proxy server 355 of the gateway is configured to provide a single point of entry (e.g., IP address and port) for clients interacting with the individual services (e.g., underlying service 450) underlying the management services platform 300. To that end, user authorization and authentication is provided at the API gateway 350 for the registered APIs rather than at the underlying services. In this manner, a uniform security mechanism is provided transparent to the underlying services such that the client does not directly communicate with the underlying services. As used herein, the term "authentication" denotes establishing and proving the identity of a client, whereas the term "authorization" denotes linking that client identity to permissions to access services (e.g., permission to forward an API call to the underlying service) of the cluster. Since the APIs are essentially used to access the data and functions of the cluster, the permissions pertain to the ability (or rights) of the client to access the service 450 of the management services platform 300 that provide such data and functions.

In an embodiment, the API gateway 350 employs the reverse-proxy server 355 in cooperation with an authorization framework (e.g., OpenAPI) using an authentication protocol (e.g., OAuth 2.0) to enable secure access by the client to the service 450. As such, a single authentication scheme may be used to access the large variety of services within the cluster. In an embodiment, a federated approach employing an authentication server via the gateway is used to authenticate a user and verify an access request to the underlying services. The authorization framework is invoked to exchange an authentication code 425, obtained from an authentication server 420, for an access token 435 that grants the client access to the management service 450 (e.g., the underlying services 310-340) via an API. To that end, the reverse-proxy server 355 redirects an access request 415 from the client for access to the management service 450 to the authentication server 420 which, upon approving access, redirects the request back to the reverse-proxy server 355 with the authentication code 425. The reverse-proxy server 355 then sends this authentication code 425 with the client's credentials (e.g., certificate, including encryption key) to the authentication server 420 (again) in exchange for the access token 435, which is similar to an API key having a specified scope and duration (e.g., valid for only a limited time).

The authentication server 420 generates and distributes the access token 435 in accordance with the authentication protocol, wherein a first portion of the access token is provided to the reverse-proxy server 355 for forwarding with the access request 415 to the service 450 and a second portion is provided to the service 450 from the authentication server 420. To complete the security implementation, the service 450 verifies the access request 415 using the second portion of the access token 435. Once verified, the client's access request 415 to the service 450 is allowed. In this manner, the underlying services may be accessed transparent to any authentication and access authorization mechanism. That is, any user authentication technique (e.g., two-factor authentication) and access authorization (e.g., storage volume permission attributes, such as read-only) may be employed by the authentication server 420. As a result, the authorization and access authorization mechanism of the authentication server may be upgraded from time to time to maintain approved use of the underlying services.

The technique described herein enables cohesive and secure access to management services of the distributed storage architecture by providing a single point of entry for clients interacting with the services underlying the management services platform. The single point of entry, i.e., the API gateway, is configured to facilitate dynamic registration of the underlying services the management services platform, such that the gateway does not have to be brought offline (e.g., continues uninterrupted operation) and rebuilt when adding or removing services from the platform. Moreover, dynamic generation of the proxy code obviates a pre-defined static configuration approach that may necessitate taking the gateway offline, thereby further increasing the durability of access to the services.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
    registering, at a gateway, an application programming interface (API) by each service of a plurality of services of a cluster;
    configuring the gateway to provide a browsable directory of the APIs for a client to formulate an API call;
    receiving the API call at the gateway from the client for a first service, the gateway acting as a reverse-proxy for the plurality of services;
    authenticating, at the gateway, a user of the API call for obtaining an access token; and
    forwarding the API call from the gateway to the first service, wherein the forwarded API call includes a first portion of the access token for verifying the API call at the first service wherein
        the registering comprises:
            receiving, at the gateway, a configuration file from a respective service of the plurality of services; and
            generating code at the gateway from the configuration file to add the API to the browsable directory for a hypertext transfer protocol (HTTP) server, and
        the authentication comprises:
            redirecting an access request included in the API call from the client to an authentication server.

2. The method of claim 1, wherein the access token is valid for a limited duration.

3. The method of claim 1, wherein the HTTP server continues uninterrupted during the addition of the API to the browsable directory.

4. The method of claim 1, wherein the API call includes a Java Script Object Notation (JSON) remote procedure call (RPC) and wherein parameters of the API call are encoded according to JSON.

5. The method of claim 1, wherein the browsable directory is organized as a hierarchical namespace.

6. The method of claim 1, wherein the plurality of services is accessed transparent to any authentication and access authorization mechanism.

7. The method of claim 1, wherein the browsable directory provides a single unified API namespace.

8. A system comprising:
    a gateway having a cluster interface for nodes of a cluster that provide a plurality of services;
    a network interface included in the gateway coupled to a client;
    a processor included in the gateway coupled to the cluster interface and the network interface, the processor configured to execute instructions to:
        register an application programming interface (API) by each service of the plurality of services;
        configure the gateway to provide a browsable directory of the APIs for the client to formulate an API call;
        receive the API call at the network interface from the client for a first service, the gateway acting as a reverse-proxy for the plurality of services;
        authenticate, at the gateway, a user of the API call to obtain an access token; and
        forward the API call to the first service via the cluster interface, wherein the forwarded API call includes a first portion of the access token for verifying the API call at the first service wherein the registering comprises:
            receiving, at the gateway, a configuration file from a respective service of the plurality of services; and
            generating code at the gateway from the configurating file to add the API to the browsable directory for hypertext protocol (HTTP) server, and
        the authentication comprises:
            redirecting an access request included in the API call from the client to an authentication server.

9. The system of claim 8, wherein the access token is valid for a limited duration.

10. The system of claim 8, wherein the HTTP server continues uninterrupted during the addition of the API to the browsable directory.

11. The system of claim 8, wherein the API call includes a Java Script Object Notation (JSON) remote procedure call (RPC), wherein parameters of the API call are encoded according to JSON.

12. The system of claim 8, wherein browsable directory is organized as a hierarchical namespace.

13. The system of claim 8, wherein the plurality of services is accessed transparent to any authentication and access authorization mechanism.

14. A non-transitory computer readable medium having instructions configured to:
    register, at a gateway, an application programming interface (API) by each service of a plurality of services of a cluster;
    configure the gateway to provide a browsable directory of the APIs for a client to formulate and API call;
    receive the API call at the gateway from the client for a first service, the gateway acting as a reverse-proxy for the plurality of services;
    authenticate, at the gateway, a user of the API call to obtain an access token; and forward the API call from the gateway to the first service, wherein the forwarded API call includes a portion of the access token for verifying the API call at the first service and the authentication comprises:
  redirecting an access request included in the API call from the client to an authentication server;
  receiving, by the gateway, the first portion of the access token from the authentication server; and
  providing a second portion of the access token by the authentication server to the first service.

15. The system of claim 8, wherein the API is verifiable using the first and second portion of the access token at the first service.

16. The method of claim 1, wherein the API call is verifiable using the first and second portion of the access token at the first service.

17. The method of claim 1, further comprising:
registering the plurality of services at the gateway.

18. The method of claim 17, further comprising:
the services dynamically configuring the gateway to provide incoming requests interaction with the services.

19. The method of claim 1, wherein the authentication further comprises:
  receiving, by the gateway, the first portion of the access token from the authentication server; and
  providing a second portion of the access token by the authentication server to the first service.

20. The system of claim 8, wherein the authentication further comprises:
  receiving, by the gateway, the first portion of the access token from the authentication server; and
  providing a second portion of the access token by the authentication server to the first service.

* * * * *